United States Patent
Bang et al.

(10) Patent No.: US 10,693,199 B2
(45) Date of Patent: Jun. 23, 2020

(54) BATTERY PACK FOR ELECTRIC VEHICLE

(71) Applicant: LG ELECTRONICS INC., Seoul (KR)

(72) Inventors: Seunghyun Bang, Seoul (KR); Bulhwui Kim, Seoul (KR); Sanghyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 138 days.

(21) Appl. No.: 15/551,731

(22) PCT Filed: Feb. 17, 2016

(86) PCT No.: PCT/KR2016/001600
§ 371 (c)(1),
(2) Date: Aug. 17, 2017

(87) PCT Pub. No.: WO2016/133360
PCT Pub. Date: Aug. 25, 2016

(65) Prior Publication Data
US 2018/0034117 A1  Feb. 1, 2018

(30) Foreign Application Priority Data
Feb. 17, 2015 (KR) .......................... 10-2015-0023846

(51) Int. Cl.
*H01M 10/613* (2014.01)
*H01M 2/10* (2006.01)
*H01M 10/625* (2014.01)
*H01M 10/663* (2014.01)
*H01M 10/6554* (2014.01)
(Continued)

(52) U.S. Cl.
CPC ....... *H01M 10/613* (2015.04); *H01M 2/1077* (2013.01); *H01M 10/625* (2015.04); *H01M 10/653* (2015.04); *H01M 10/6554* (2015.04); *H01M 10/663* (2015.04); *H01M 10/647* (2015.04); *H01M 2220/20* (2013.01)

(58) Field of Classification Search
None
See application file for complete search history.

(56) References Cited

FOREIGN PATENT DOCUMENTS

JP       2011034775       2/2011
KR    10-2013-0068975     6/2013
(Continued)

OTHER PUBLICATIONS

Bin KR 2014-0140679 Dec. 10, 2014 translation obtained from Google Patents on Jun. 19, 2019 (Year: 2014).*
(Continued)

*Primary Examiner* — Sarah A. Slifka
(74) *Attorney, Agent, or Firm* — Fish & Richardson P.C.

(57) ABSTRACT

Disclosed is a battery pack for an electric vehicle including a battery cell module, a battery receiving region in which a cell module support unit configured to support the battery cell module is provided, a cooling plate provided between the battery cell module and the cell module support unit, the cooling plate having a shape corresponding to a shape of the battery cell module, and a gap prevention pad configured to prevent a gap from being formed between the cooling plate and the battery cell module when the battery cell module is fixed in the battery receiving region, thereby preventing deterioration in cooling performance and durability.

16 Claims, 10 Drawing Sheets

(51) Int. Cl.
*H01M 10/653* (2014.01)
*H01M 10/647* (2014.01)

(56) References Cited

FOREIGN PATENT DOCUMENTS

| KR | 10-2014-0040327 | 4/2014 |
| KR | 10-2014-0140679 | 12/2014 |
| KR | 10-2014-0145250 | 12/2014 |

OTHER PUBLICATIONS

Soo KR 2014-0145250 Dec. 23, 2014 translation obtained from Google Patents on Jun. 19, 2019 (Year: 2014).*
Young KR 2013-0068975 Jun. 26, 2013 translation obtained from Google Patents on Jun. 19, 2019 (Year: 2013).*
International Search Report in International Application No. PCT/KR2016/001600, dated Jul. 25, 2016, 3 pages (with English translation).

* cited by examiner

[Fig. 1]
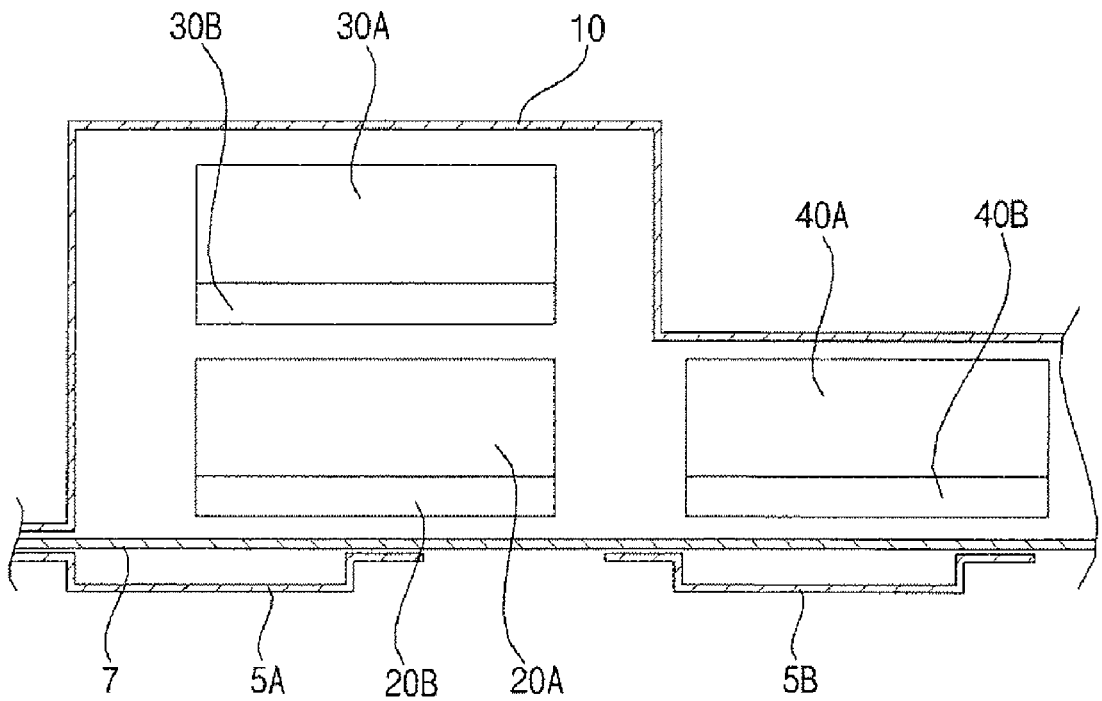
[Fig. 2]
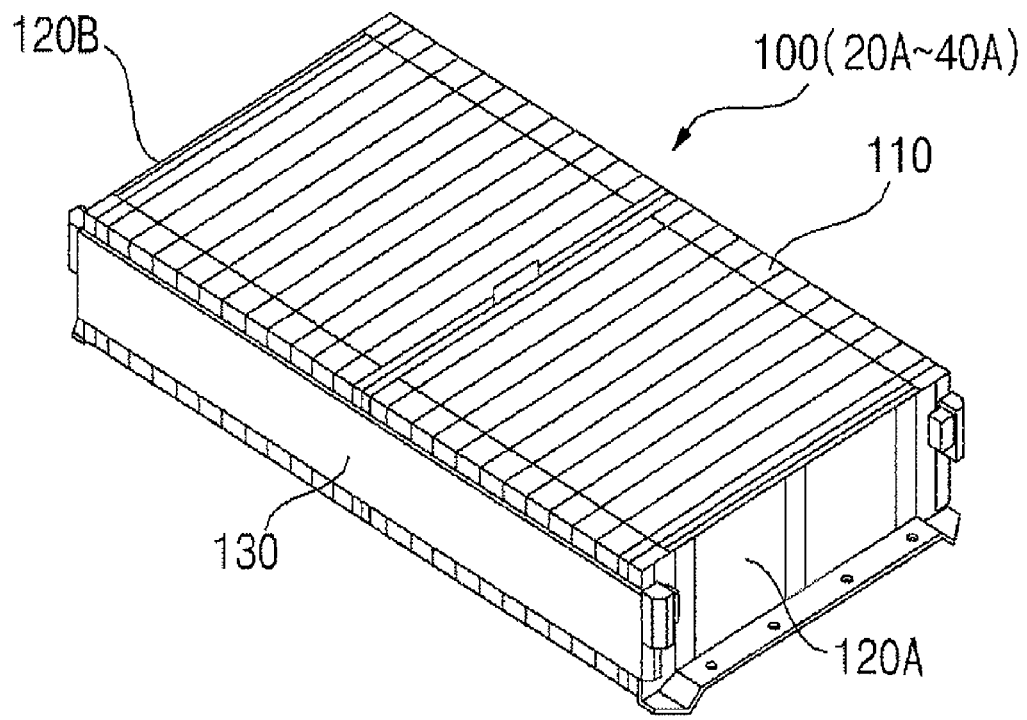

[Fig. 3]
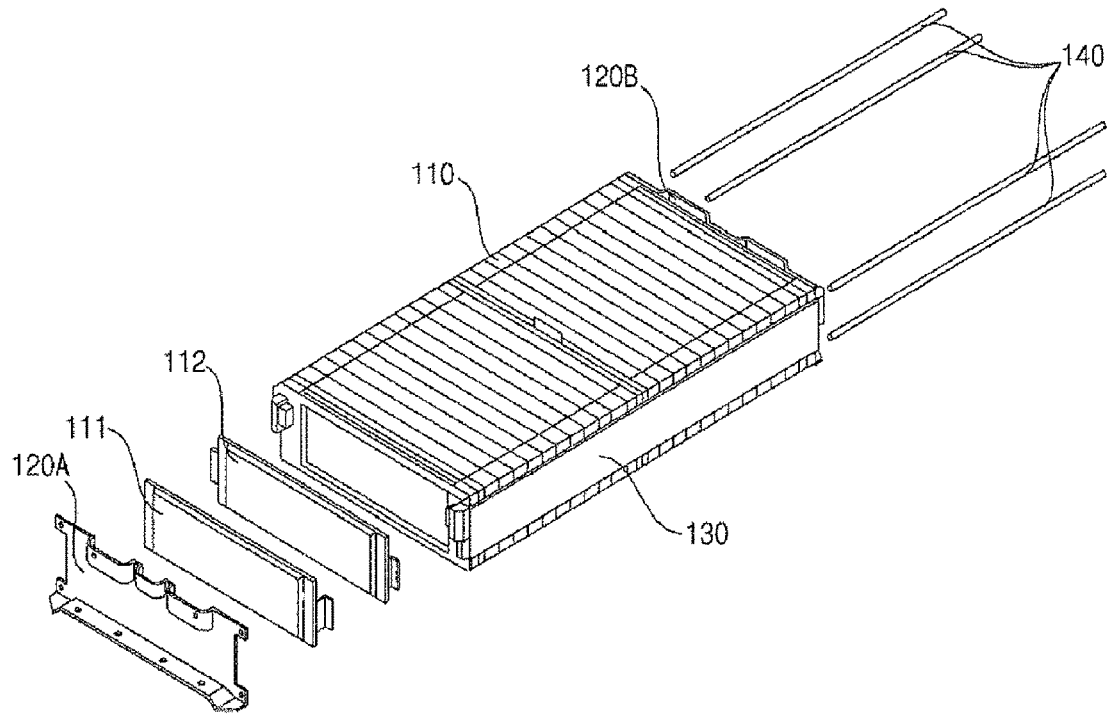
[Fig. 4]
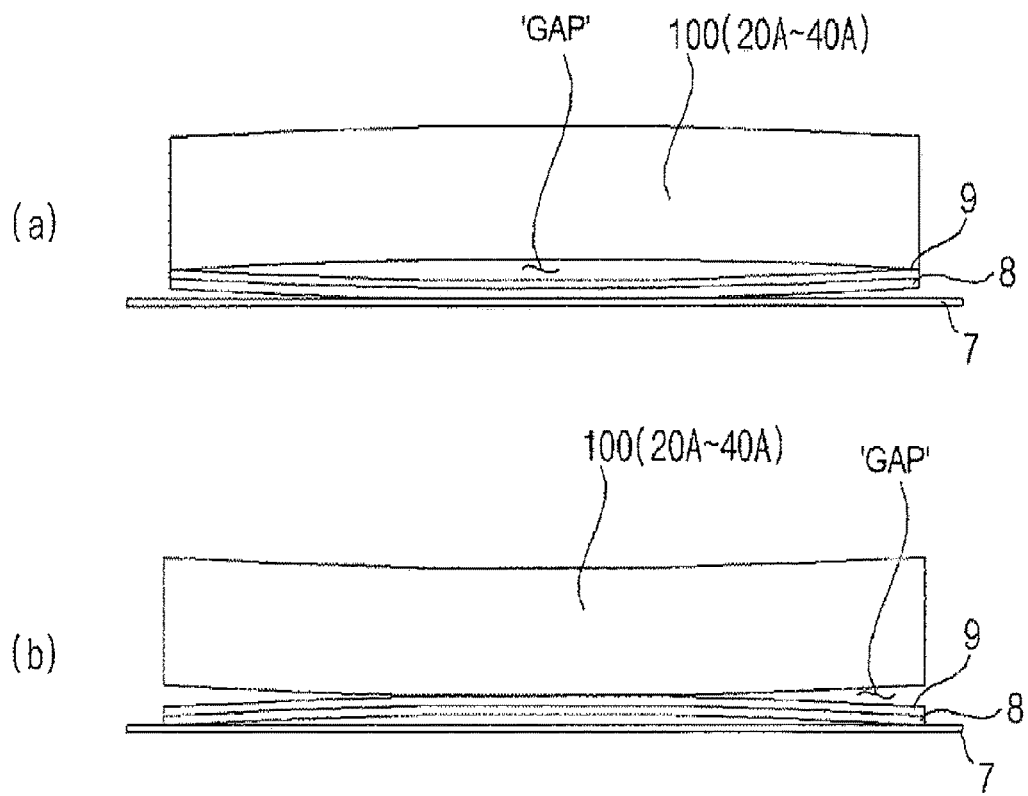

[Fig. 5]
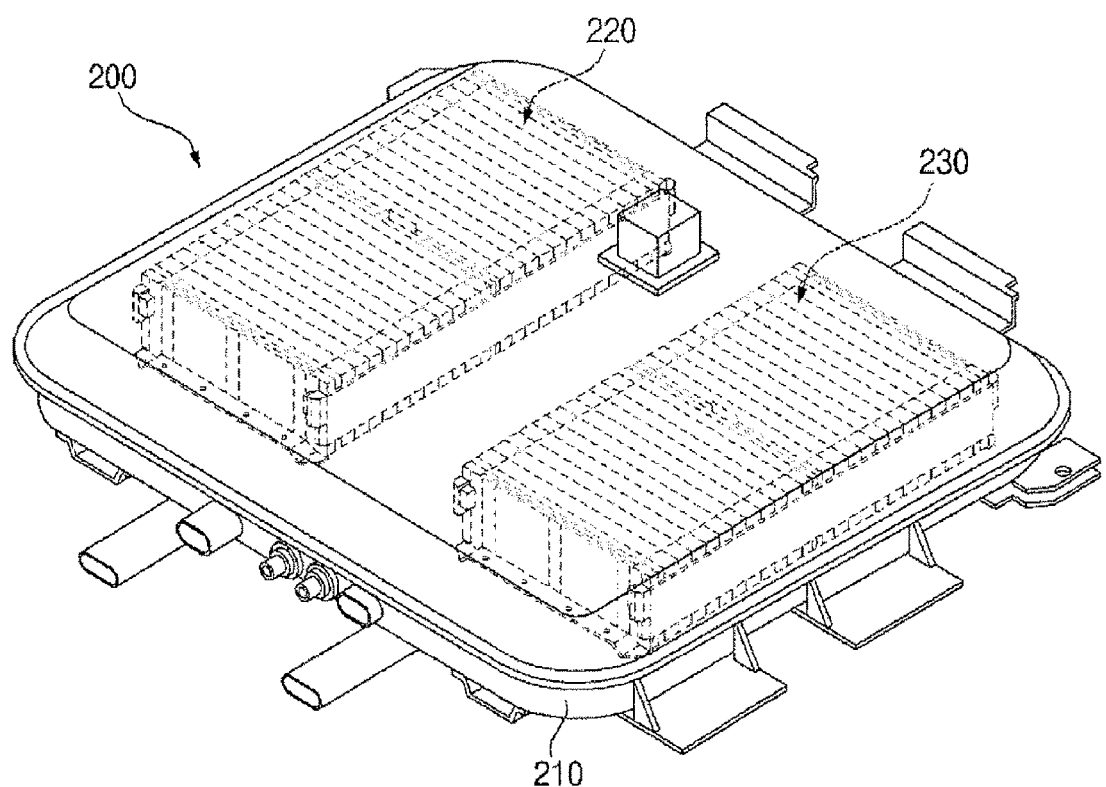

[Fig. 6]
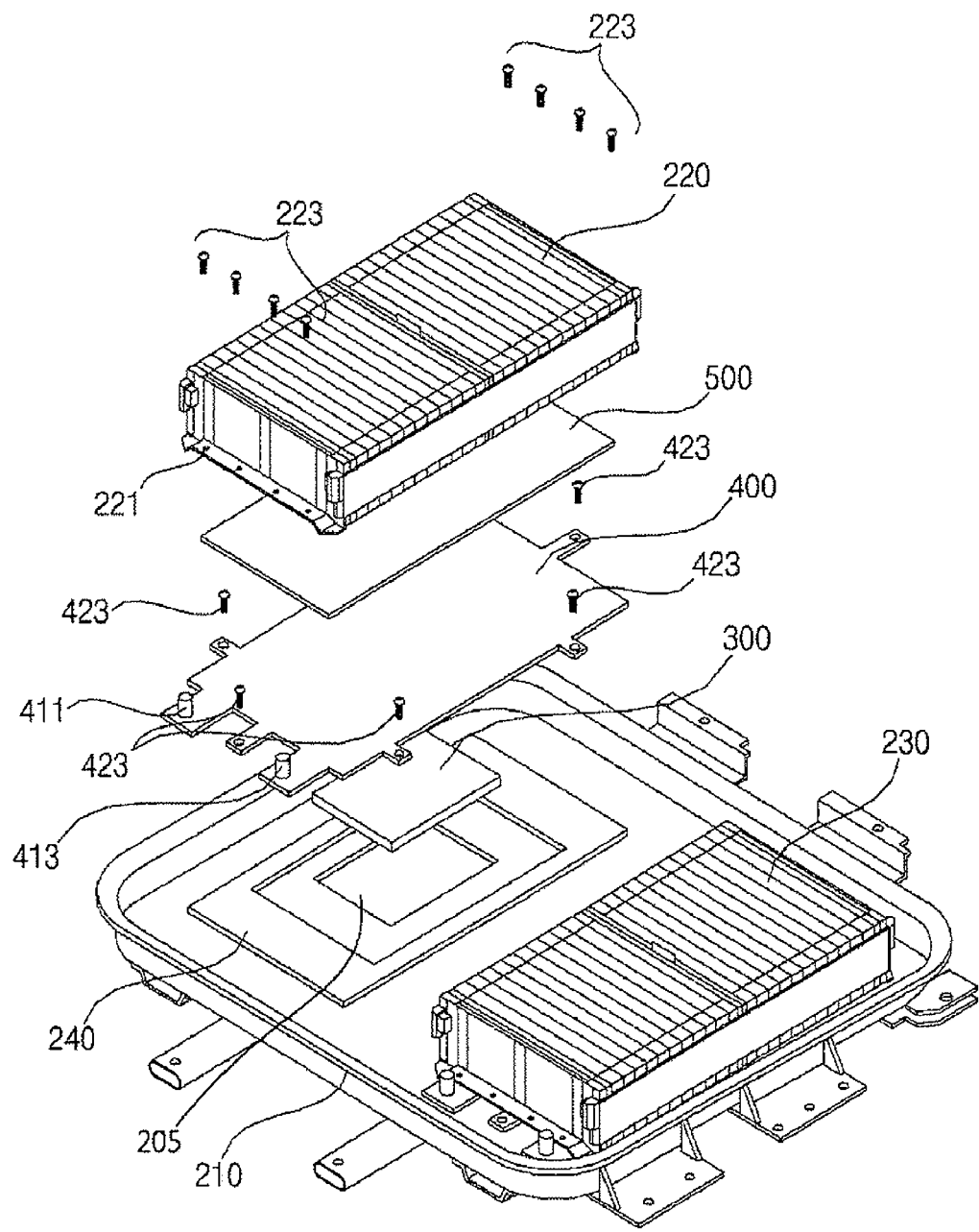

[Fig. 7a]
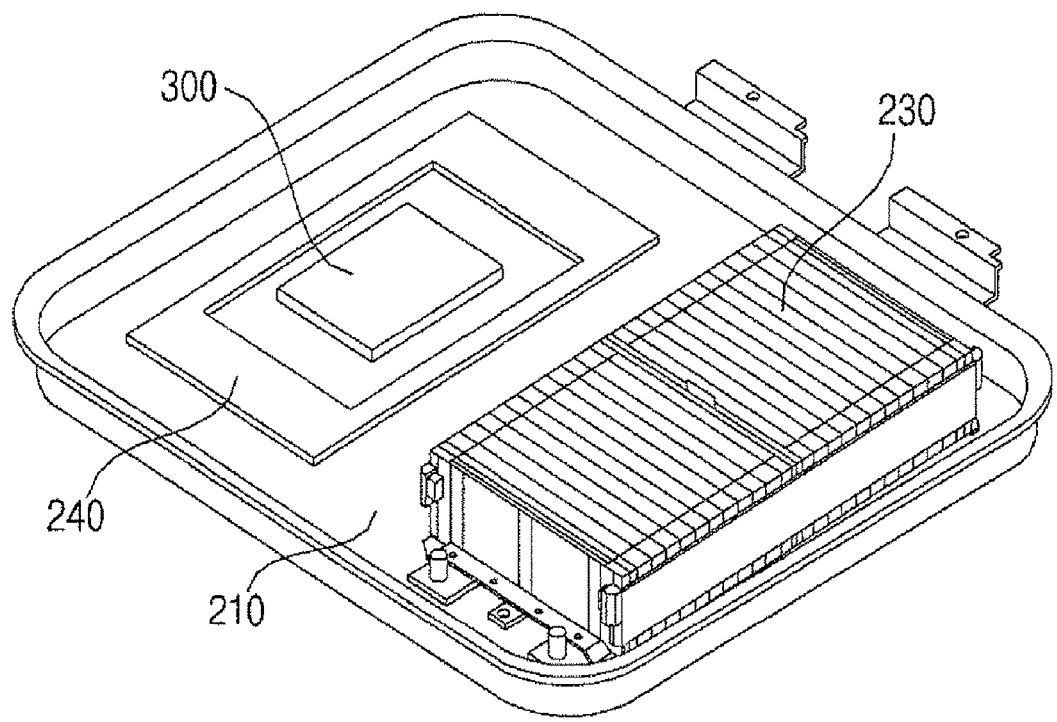
[Fig. 7b]
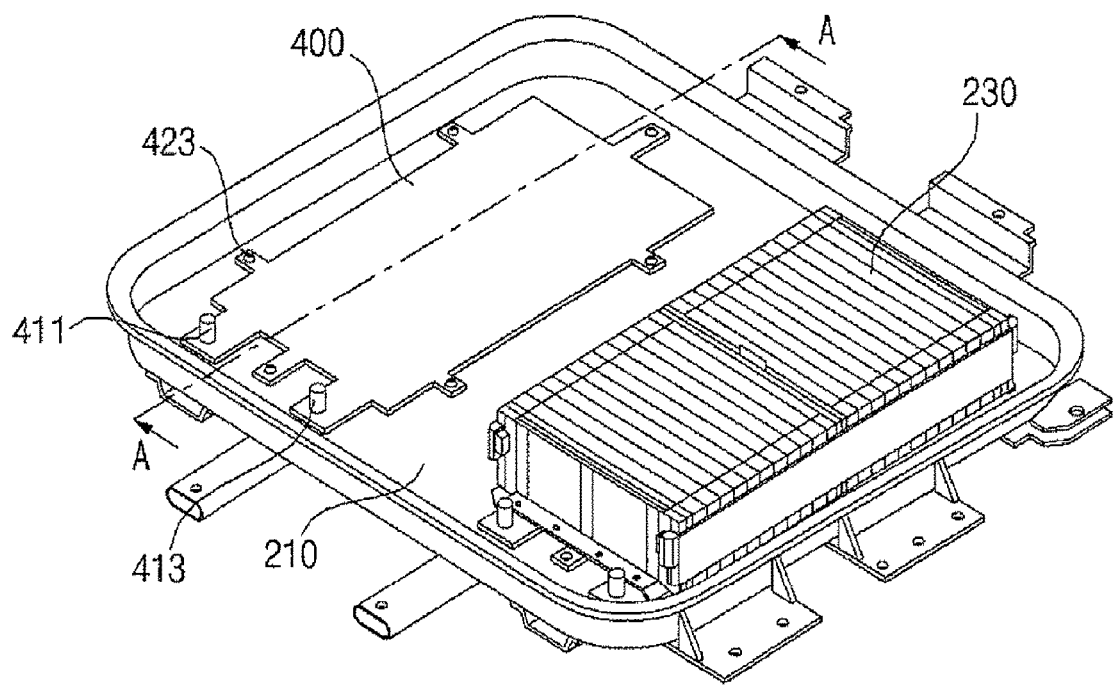

[Fig. 7c]
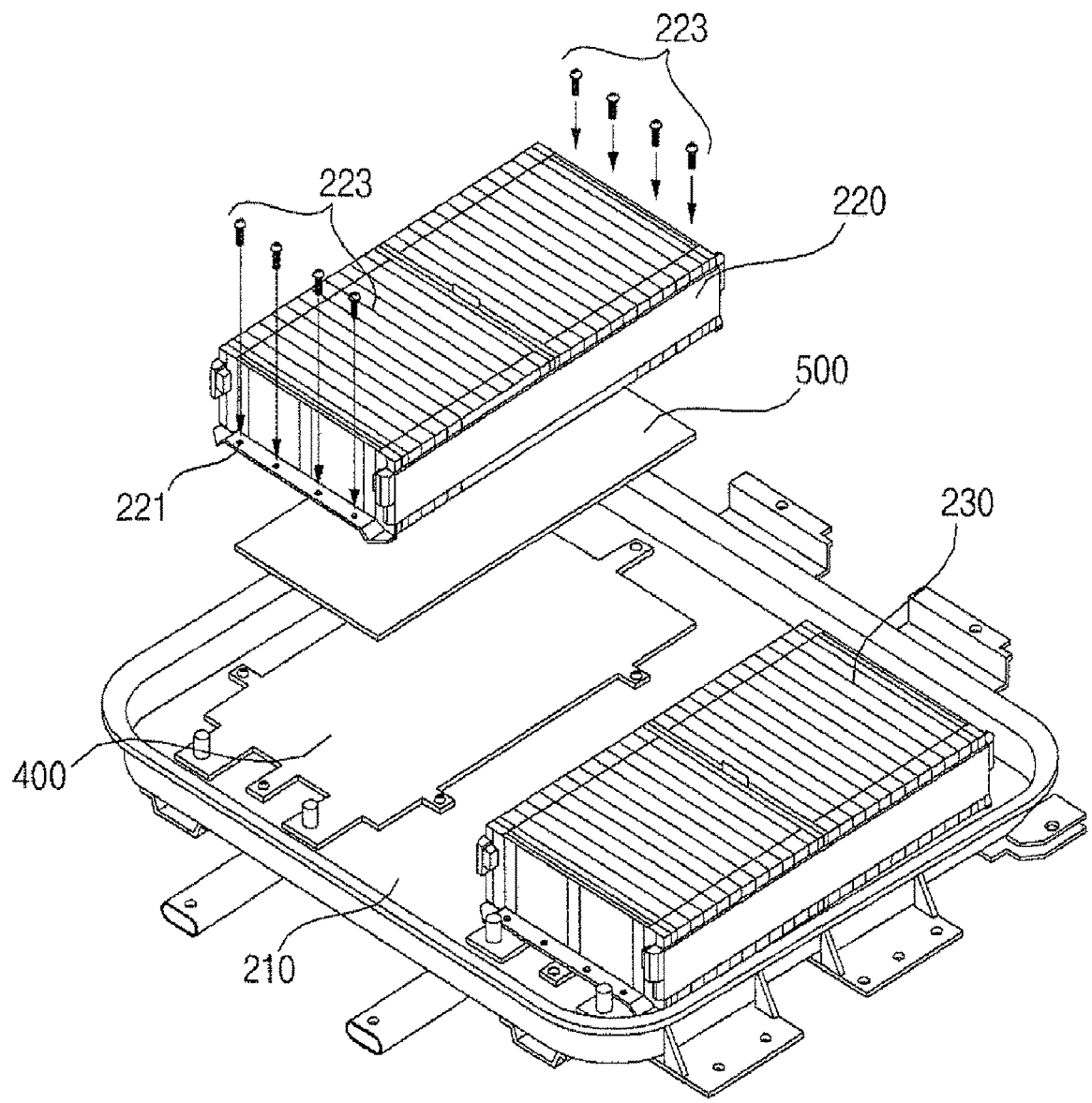

[Fig. 7d]
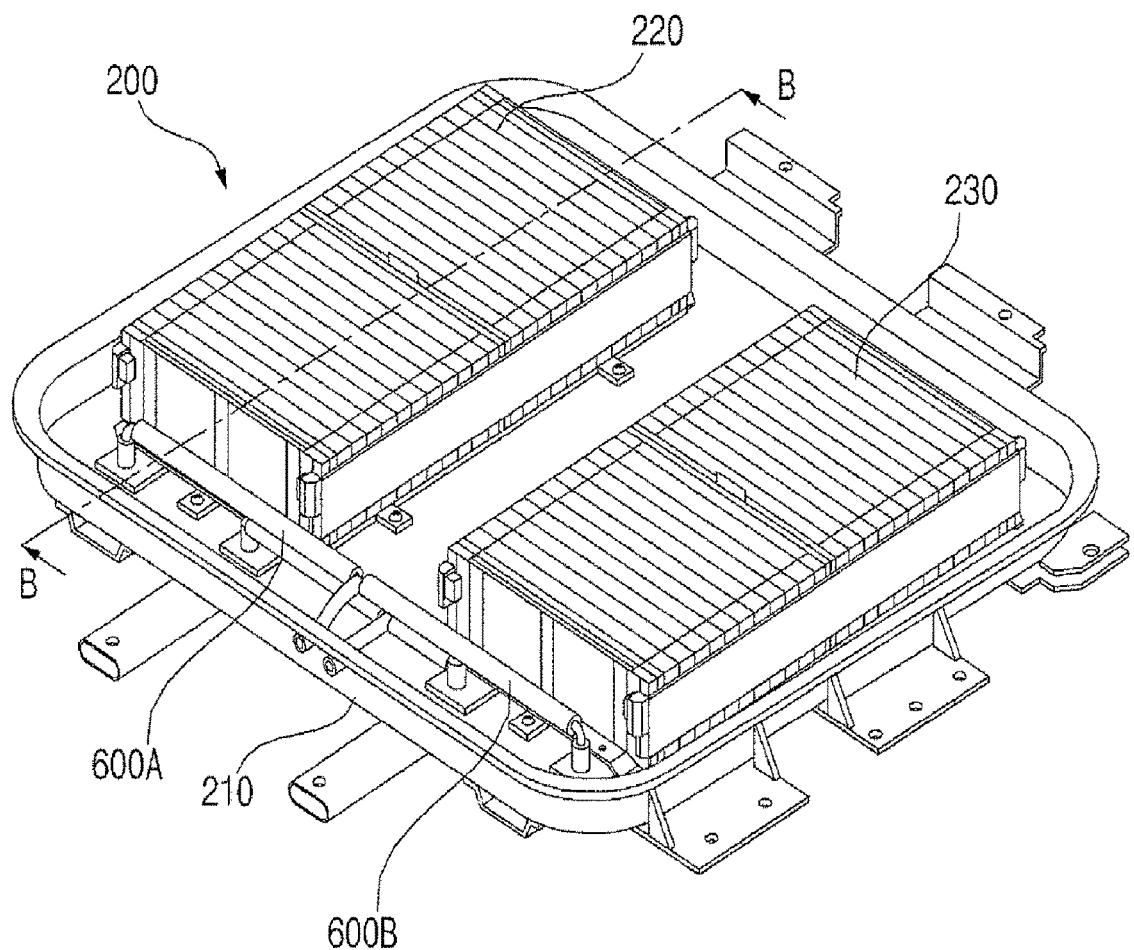
[Fig. 8a]
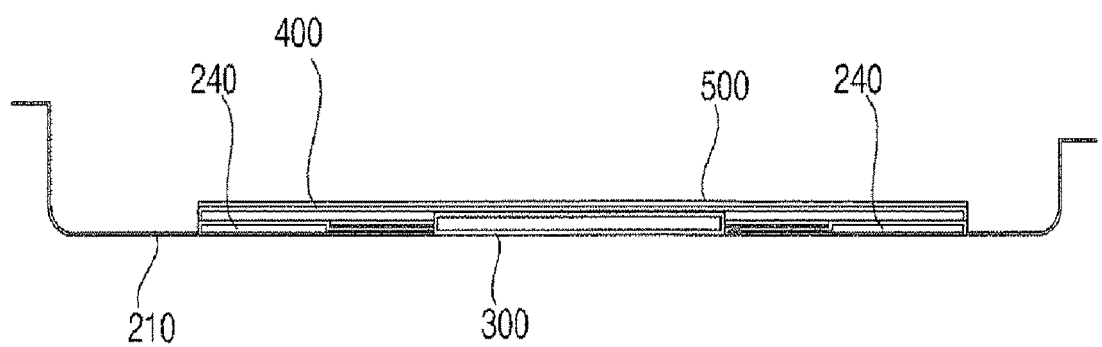

[Fig. 8b]
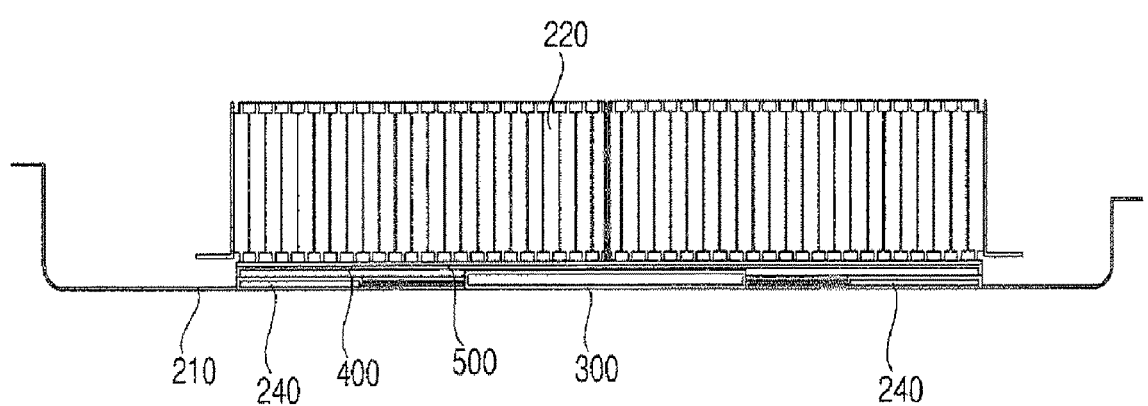

[Fig. 9]
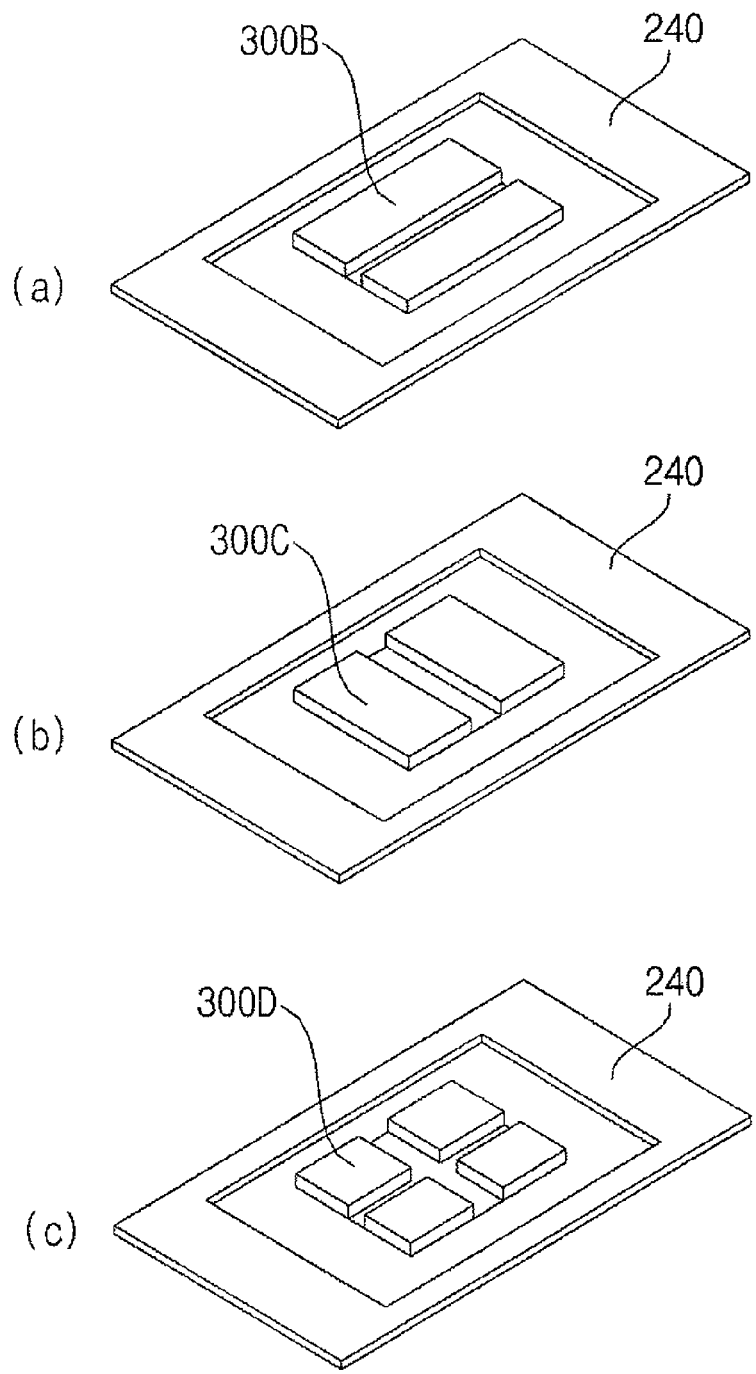

[Fig. 10]
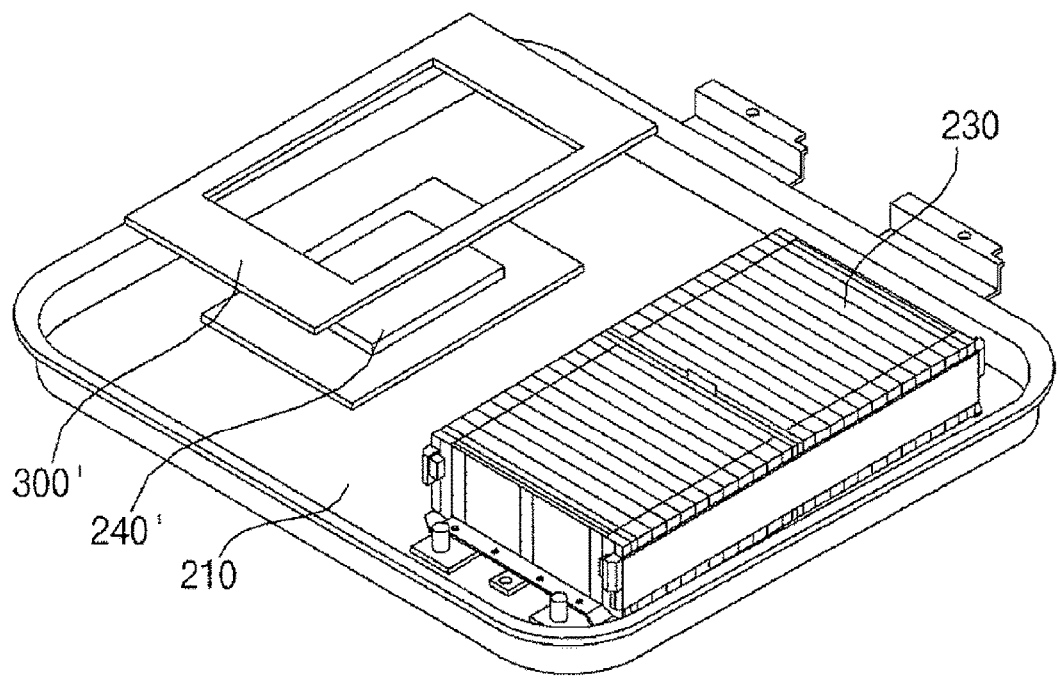
[Fig. 11]
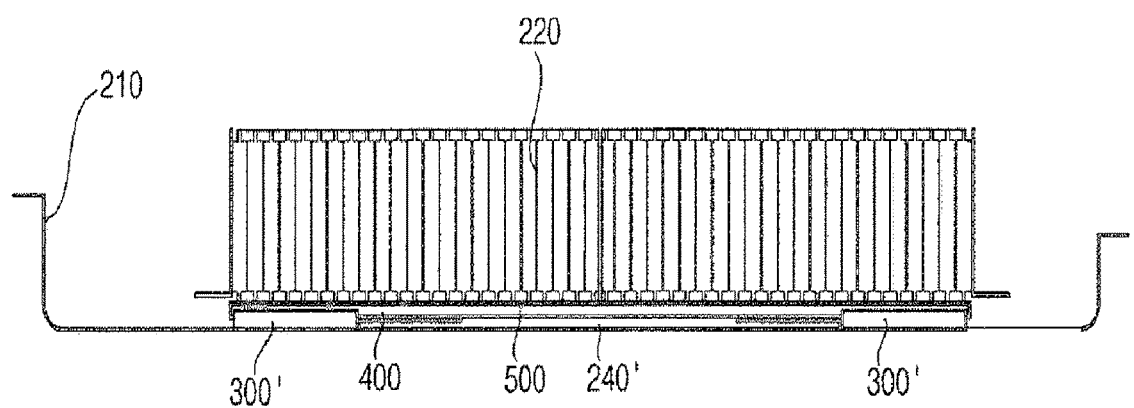

BATTERY PACK FOR ELECTRIC VEHICLE

CROSS-REFERENCE TO RELATED APPLICATIONS

This application is a National Stage application under 35 U.S.C. § 371 of International Application No. PCT/KR2016/001600, filed Feb. 17, 2016, which claims the benefit of Korean Application No. 10-2015-0023846, filed on Feb. 17, 2015. The disclosures of the prior applications are incorporated by reference in their entirety.

TECHNICAL FIELD

The present invention relates to a battery pack for an electric vehicle, and more particularly, to a battery pack for an electric vehicle, which is capable of improving cooling efficiency of a battery cell module.

BACKGROUND ART

One of the most serious problems afflicting vehicles that use fossil fuels such as, for example, gasoline and diesel, is the resultant air pollution. As a solution to solve this problem, attention is being paid to technology that uses a secondary battery, which may be charged or discharged, as a power source for a vehicle. Thereby, for example, electric vehicles (EV), which move using only a battery, and hybrid electric vehicles (HEV), which use a battery and an existing engine together, have been developed, and some of them have been commercialized. Although a nickel metal hydrogen (Ni-MH) battery is mainly used as a secondary battery serving as the power source of, for example, an EV and a HEV, the use of, for example, a lithium ion battery has recently been attempted.

In order to be used as the power source of, for example, an EV and a HEV, the secondary battery must have a high output and a large capacity. To this end, a plurality of small secondary batteries (unit batteries) may be connected to one another in series, or in some cases, may be connected in series or parallel with one another so as to constitute a battery cell module.

FIG. 1 is a conceptual view illustrating one example of a battery pack for an electric vehicle in accordance with the related art, FIG. 2 is a perspective view illustrating a battery cell module, which constitutes the battery pack of FIG. 1, FIG. 3 is an exploded perspective view illustrating the battery cell module of FIG. 2, and FIG. 4 is a conceptual view illustrating deterioration in cooling performance attributable to the shape of the battery cell module.

One example of the battery pack for the electric vehicle in accordance with the related art, as illustrated in FIGS. 1 to 3, includes frame assemblies 5A and 5B, which are arranged parallel with each other in order to install a plurality of battery cell modules 20A, 30A and 40A inside a battery carrier (not illustrated), a mounting tray 7 disposed above the frame assemblies 5A and 5B, and a battery pack cover 10, which covers the top of the battery carrier and the battery cell modules 20A, 30A and 40A, which are horizontally arranged parallel with one another, or are vertically stacked one above another above the mounting tray 7.

Here, cooling plates 20B, 30B and 40B are disposed on the underside of the respective battery cell modules 20A, 30A and 40A in order to remove heat generated from the battery cell modules 20A, 30A and 40A. The cooling plates 20B, 30B and 40B serve to cool the battery cell modules 20A, 30A and 40A upon receiving coolant through a coolant hose (not illustrated).

Each of the battery cell modules 100; 20A, 30A or 40A, as illustrated in FIGS. 2 and 3, includes a plurality of secondary batteries 110, which are vertically upright and are arranged parallel with one another in the left-and-right direction by a long length, and a first end plate 120A and a second end plate 120B, which are arranged at opposite ends of the battery cell module and are coupled respectively to outermost secondary batteries 110 so as to come into close contact with the same. The battery cell module 100 has an approximately rectangular shape that is elongated in the left-and-right direction, and an internal circuit board (ICB) 130 is disposed on the remaining side surface portion excluding the first end plate 120A and the second end plate 120B.

In the secondary batteries 110, which are arranged parallel with one another in the left-and-right direction by a long length, each unit battery consists of a battery 111, which serves as an anode, and a battery 112, which serves as a cathode. The respective batteries are attached to one another using a plurality of long bolts 140, which longitudinally penetrate into corner portions of the batteries, so as to construct a single battery cell module 100.

However, in the example of the battery pack for the electric vehicle in accordance with the related art, as illustrated in FIG. 4, a prescribed gap may be formed between the battery cell module 100; 20A, 30A or 40A and the cooling plate 8; 20B, 30B or 40B, which is provided to cool the battery cell module 100; 20A, 30A or 40A, attributable to the shape of the receiving space defined inside the battery carrier, or deformation of the lower surface of the battery cell module 100; 20A, 30A or 40A due to the intrinsic weight thereof. The gap may deteriorate cooling performance.

More specifically, although a thermal pad 9 is disposed so as to prevent a gap from being formed between the lower surface of the battery cell module 100; 20A, 30A or 40A and the cooling plates 8; 20B, 30B or 40B, as illustrated in (a) of FIG. 4, in the case where the lower surface of the battery cell module 100; 20A, 30A or 40A is shaped to be convex upward, the central portion of the cooling plate 8; 20B, 30B or 40B, which is in surface contact with the lower surface of the battery cell module 100; 20A, 30A or 40A, may sag due to the intrinsic weight thereof because the cooling plate 8; 20B, 30B or 40B is elongated in the left-and-right direction. Thereby, ae gap, which deteriorates cooling performance, may be formed between the upper surface of the thermal pad 9 and the lower surface of the battery cell module 100; 20A, 30B or 40A. In addition, as illustrated in (b) of FIG. 4, in the case where the lower surface of the battery cell module 100; 20A, 30A or 40A is shaped to be concave downward, opposite left and right end portions of the battery cell module 100; 20A, 30A or 40A may sag due to the intrinsic weight thereof. Thereby, a gap as described above may be formed between the upper surface of the thermal pad 9 and the lower surface of the battery cell module 100; 20A, 30B or 40A, which causes deterioration in cooling performance.

DISCLOSURE OF INVENTION

Technical Problem

Accordingly, the present invention is devised to solve the above-described problems, and it is an object of the present invention to provide a battery pack for an electric vehicle, which is capable of improving cooling performance regardless of the shape of a battery cell module and reducing the transmission of vibrations from the road surface while the vehicle is driving.

Solution to Problem

To achieve the above described object, in accordance with one aspect of the present invention, there is provided a battery pack for an electric vehicle, including a battery cell module, a battery receiving region in which a cell module support unit configured to support the battery cell module is provided, a cooling plate provided between the battery cell module and the cell module support unit, the cooling plate having a shape corresponding to a shape of the battery cell module, and a gap prevention pad configured to prevent a gap from being formed between the cooling plate and the battery cell module when the battery cell module is fixed in the battery receiving region.

Here, the cooling plate may have an upper surface configured to come into close contact with a lower surface of the battery cell module so as to support the lower surface, and the cooling plate may have a lower surface configured to be supported by the cell module support unit, and the gap prevention pad provided on a region excluding the cell module support unit.

In addition, the gap prevention pad may include at least one gap prevention pad located at a different height from the cell module support unit and formed of a different material from the cell module support unit, and the gap prevention pad may be in contact with the cooling plate.

In addition, the gap prevention pad may include at least one gap prevention pad located at a different height from the cell module support unit or formed of a different material from the cell module support unit, and the gap prevention pad may be in contact with the cooling plate.

In addition, the gap prevention pad may be located between outermost fastening members at longitudinal opposite ends, among fastening members used to secure the battery cell module and the cell module support unit to each other.

In addition, the gap prevention pad may be located at a position to support a lower surface of the battery cell module while surrounding the cell module support unit.

In addition, the battery receiving region may be formed in a bottom surface thereof with a pad seating recess in which the gap prevention pad is seated and coupled.

In addition, the battery pack may further include an air conditioning module including a compressor, a condenser, an expander, and an evaporator, and the cooling plate may have an inlet port configured to receive coolant diverged from one side of the air conditioning module and an outlet port configured to supply the coolant, having undergone heat exchange with the battery cell module, to a remaining side of the air conditioning module.

In addition, the battery pack may further include an inner heat exchanger configured to undergo heat exchange with coolant diverged from any one of a path between a compressor and a condenser, a path between the condenser and an expander, a path between the expander and an evaporator, and a path between the evaporator and the compressor, and a pump configured to guide brine, having undergone heat exchange via the inner heat exchanger, to the cooling plate, and the cooling plate may have an inlet port and an outlet port for introduction and discharge of the brine.

In addition, the battery pack may further include a cooling supply hose and a cooling discharge hose connected respectively to the inlet port and the outlet port of the cooling plate for introduction and discharge of the coolant or brine inside the cooling plate, and the cooling supply hose and the cooling discharge hose may be provided in a number corresponding to the number of the battery cell module, and a flow rate of the coolant or brine, which flows through the cooling supply hose and the cooling discharge hose, is controlled so as to be proportional to a capacity of the battery cell module.

Meanwhile, in accordance with another aspect of the present invention, there is provided a battery pack for an electric vehicle, including a battery cell module, a battery carrier having a receiving space in which the battery cell module is received, the battery carrier being secured to a vehicle body using a fastening member, a cell module support unit disposed on a bottom of the receiving space in the battery carrier, a cooling plate stacked on the cell module support unit, a thermal pad interposed between the battery cell module and the cooling plate so as to transfer heat generated in the battery cell module to the cooling plate, and a gap prevention pad disposed on the bottom of the receiving space in the battery carrier so as to support a portion of a lower surface of the cooling plate in cooperation with the cell module support unit, thereby preventing a gap from being formed between a lower surface of the battery cell module and the thermal pad and preventing a gap from being formed between the thermal pad and the cooling plate.

Here, the gap prevention pad may be located in an installation hole formed at a location of the cell module support unit for supporting a central portion of the lower surface of the cooling plate.

In addition, the gap prevention pad may include at least two or more gap prevention pads arranged in the installation hole.

In addition, the gap prevention pad may be positioned so as to support opposite left and right ends of the cooling plate.

In addition, the gap prevention pad may have a higher upper surface than an upper surface of the cell module support unit.

In addition, the gap prevention pad may be disposed on the bottom of the receiving space in the battery carrier so as to surround a rim of the cell module support unit.

In addition, the bottom of the receiving space in the battery carrier may be provided with a pad seating recess in which the gap prevention pad is seated and coupled.

In addition, the gap prevention pad may be formed of an elastic material.

In addition, the gap prevention pad may be formed of any one of an elastic spring, rubber, and foamed plastics.

In addition, the battery pack may further include a cooling supply hose configured to supply coolant or brine into the cooling plate and a cooling discharge hose configured to discharge the coolant or brine having undergone heat exchange from the cooling plate, and the cooling plate may include an inlet port configured to receive the coolant or brine from the cooling supply hose, and an outlet port configured to discharge the coolant or brine having undergone heat exchange from the cooling discharge hose.

Advantageous Effects of Invention

A battery pack for an electric vehicle in accordance with one exemplary embodiment of the present invention may achieve the effects as follows.

First, even in the case where the lower surface of a battery cell module is shaped so as to be convex upward or concave downward, the transfer of heat to a cooling plate may be implemented without a gap, which may prevent deterioration in cooling performance.

Second, a gap prevention pad is formed of an elastic material, thus serving to alleviate vibrations generated from the road surface while the vehicle is driving.

The effects of the present invention are not limited to the above described effects, and other effects not mentioned above may be clearly understood by those skilled in the art from the description of the claims.

BRIEF DESCRIPTION OF DRAWINGS

The above and other objects, features and other advantages of the present invention will be more clearly understood from the following detailed description taken in conjunction with the accompanying drawings, in which:

FIG. 1 is a conceptual view illustrating one example of a battery pack for an electric vehicle in accordance with the related art;

FIG. 2 is a perspective view illustrating a battery cell module, which constitutes the battery pack of FIG. 1;

FIG. 3 is an exploded perspective view illustrating the battery cell module of FIG. 2;

FIG. 4 is a conceptual view illustrating deterioration in cooling performance attributable to the shape of the battery cell module;

FIG. 5 is a perspective view illustrating a battery pack for an electric vehicle in accordance with an exemplary embodiment of the present invention;

FIG. 6 is an exploded perspective view illustrating the battery pack for the electric vehicle of FIG. 5;

FIGS. 7A to 7D are views illustrating the assembly sequence of the battery pack for the electric vehicle in accordance with an exemplary embodiment of the present invention;

FIG. 8A is a sectional view taken along line A-A of FIG. 7B;

FIG. 8B is a sectional view taken along line B-B of FIG. 7D;

FIG. 9 is a perspective view illustrating various application shapes of a gap prevention pad in accordance with a first embodiment, among constituent elements of the battery pack for the electric vehicle in accordance with the exemplary embodiment of the present invention;

FIG. 10 is an exploded perspective view illustrating a gap prevention pad in accordance with a second embodiment, among constituent elements of the battery pack for the electric vehicle in accordance with the exemplary embodiment of the present invention; and FIG. 11 is a sectional view illustrating the mounted state of the battery cell module of FIG. 10.

BEST MODE FOR CARRYING OUT THE INVENTION

Hereinafter, an exemplary embodiment of a battery pack for an electric vehicle in accordance with the present invention will be described in detail with reference to the accompanying drawings.

FIG. 5 is a perspective view illustrating a battery pack for an electric vehicle in accordance with an exemplary embodiment of the present invention. FIG. 6 is an exploded perspective view illustrating the battery pack for the electric vehicle of FIG. 5. FIGS. 7A to 7D are views illustrating the assembly sequence of the battery pack for the electric vehicle in accordance with an exemplary embodiment of the present invention. FIG. 8A is a sectional view taken along line A-A of FIG. 7B, and FIG. 8B is a sectional view taken along line B-B of FIG. 7D.

In the exemplary embodiment of the present invention, the battery pack 200 for the electric vehicle, as illustrated in FIGS. 5 to 7D, includes battery cell modules 220 and 230, a battery receiving region (see reference numeral 210 of FIG. 5) in which cell module support units 240 configured to support the battery cell modules 220 and 230 are received, cooling plates 400 provided between the battery cell modules 220 and 230 and the cell module support units 240, the cooling plates 400 having a shape corresponding to the battery cell modules 220 and 230, and gap prevention pads 300 configured to prevent a gap from being formed between the cooling plates 400 and the battery cell modules 220 and 230 when the battery cell modules 220 and 230 are fixed in the battery receiving region.

Here, "battery receiving region" may be a term that indicates a battery carrier 210 having an open upper side, as will be described below. Hereinafter, the term "battery receiving region" is used as meaning that indicates the entire space in which the battery cell modules 220 and 230 described above are received, and a constituent element having the battery receiving region is substantially referred to as the "battery carrier 210".

More specifically, in the exemplary embodiment of the present invention, the battery pack 200 for the electric vehicle may include the battery cell modules 220 and 230, the battery carrier 210, which defines the receiving space in which the battery cell modules 220 and 230 are received, the battery carrier 210 being secured to a vehicle body via fastening members (not illustrated), cell module support units 240 disposed on the bottom of the receiving space in the battery carrier 210, the cooling plates 400 stacked on the cell module support units 240, thermal pads 500 interposed between the battery cell modules 220 and 230 and the cooling plates 400 so as to transfer heat generated from the battery cell modules 220 and 230 to the cooling plates 400, and the gap prevention pads 300, which are disposed on the bottom of the receiving space in the battery carrier 210 so as to support a portion of the lower surfaces of the cooling plates 400 in cooperation with the cell module support units 240, the gap prevention pads 300 serving to prevent a gap from being formed between the lower surfaces of the battery cell modules 220 and 230 and the thermal pads 500 and between the thermal pads 500 and the cooling plates 400.

In the battery cell modules 220 and 230 as described above in the "Background" section, a plurality of secondary batteries (unit battery: cell) is assembled with one another so as to constitute a single module. The single module is sufficient to supply power required for the driving of the vehicle and to enable charging and discharging thereof.

The respective battery cell modules 220 and 230 take the form of a cuboid having an approximate rectangular horizontal cross section that is elongated in the left-and-right direction, and is an assembly of a plurality of secondary batteries. The lower surface of each of the battery cell modules 220 and 230 may have an overall shape such that it is convex upward or concave downward toward the center based on the shape of the bottom of the receiving space in the battery carrier 210, or may have an overall shape such that it is flat.

The cell module support units 240 are formed of a metal or plastic material. The cell module support units 240 are equal in number to the number of the battery cell modules 220 and 230, which are arranged on the bottom of the receiving space in the battery carrier 210, and serve to fix the positions of the battery cell modules 220 and 230.

Each cell module support unit 240 described above is disposed on the bottom of the receiving space in the battery carrier 210 so that the upper surface thereof is at the same height as or a slightly different height from that of the gap prevention pad 300 described above, and thus substantially serves to support the lower surface of the cooling plate 400.

Here, the upper surface of the cooling plate 400 comes into close contact with the lower surface of each battery cell module 220 or 230 so as to support the lower surface. The lower surface of the cooling plate 400 may be supported by the cell module support unit 240, and may also be supported by the gap prevention pad 300, which is located in a region excluding the cell module support unit 240 and is not supported by the cell module support unit 240.

The gap prevention pad 300, as illustrated in FIG. 6, may be seated on and coupled to the battery receiving region, more precisely, a pad seating recess 205, which is formed in the bottom of the receiving space in the battery carrier 210. The pad seating recess 205 serves to prevent the formation of a horizontal gap after the gap prevention pad 300 is seated therein and coupled thereto, and to indicate the accurate coupling position of the gap prevention pad 300 in accordance with various embodiments as will be described below.

The cooling plate 400 may have a prescribed thickness to allow coolant (not illustrated) to be introduced into one side thereof and to be discharged from the other side thereof after circulating and undergoing heat exchange inside the cooling plate 400. The cooling plate 400 may have an approximate shape corresponding to the lower surface of the battery cell module 220 or 230 in order to ensure that heat exchange evenly occurs throughout the lower surface of the battery cell module 220 or 230.

The cooling plate 400 functions to cool battery cells by removing heat generated in the battery cell module 220 or 230. Although fluid introduced into the cooling plate 400 may be gas-phase fluid or liquid-phase fluid, in the case of gas-phase fluid, it is advantageous for air to be blown to the entire battery cell module 220 or 230 at the same time through the use of, for example, a blower. Therefore, in the exemplary embodiment of the present invention, fluid to be moved to a limited portion such as the cooling plate 400 will be described as being limited to liquid-phase fluid, and any kind of liquid-phase fluid that functions as coolant may be permitted.

For example, although not illustrated in the drawings, in accordance with the exemplary embodiment of the present invention, the battery pack 200 for the electric vehicle further includes an air conditioning module, which is comprised of a compressor, a condenser, an expander, and an evaporator, and is separately provided outside the battery receiving region described above. The cooling plate 400 may be configured such that coolant is supplied from one side of the air conditioning module and is then again supplied to the other side of the air conditioning module after undergoing heat exchange with the battery cell module 220 or 230.

In another example, although not illustrated, in accordance with the exemplary embodiment of the present invention, the battery pack 200 for the electric vehicle may further include an inner heat exchanger, which is configured to undergo heat exchange with coolant diverged from any one of a path between the compressor and the condenser, a path between the condenser and the expander, a path between the expander and the evaporator, and a path between the evaporator and the compressor, and a pump (not illustrated), which is configured to guide brine, which has heat-exchanged via the inner heat exchanger, to the cooling plate 400. At this time, the brine substantially serves as a heat exchange fluid that undergoes heat exchange with the battery cell modules 220 and 230.

Brine, as is known, is an intermediate material that performs an indirect freezing operation, and may be a water solution such as, for example, calcium chloride, sodium chloride, or magnesium chloride, and may be cooling water that serves as a heat exchange medium, unlike coolant, which directly performs heat exchange.

The cooling plate 400, as illustrated in FIG. 6, may have an inlet port 411, into which coolant or brine is introduced, and an outlet port 413, from which coolant or brine is discharged. As illustrated in FIG. 7, a cooling supply hose 600A and a cooling discharge hose 600B, which are installed inside and outside the receiving space in the battery carrier 210, may be connected respectively to the inlet port 411 and the outlet port 413 of the cooling plate 400 so as to enable the supply or discharge of coolant or brine.

Here, through the inlet port 411 and the outlet port 413 of the cooling plate 400, the cooling supply hose 600A and the cooling discharge hose 600B may be connected to the air conditioning module to enable the direct introduction of coolant of the air conditioning module, and the cooling supply hose 600A and the cooling discharge hose 600B may be connected to the inner heat exchanger to enable the direct introduction of brine of the inner heat exchanger.

In addition, in the case where two or more battery cell modules 220 and 230 are provided, the cooling supply hose 600A and the cooling discharge hose 600B may be equal in number to the number of the battery cell modules 220 and 230, and the flow rate of coolant or brine, which flows inside the cooling supply hose 600A and the cooling discharge hose 600B, may be controlled so as to be proportional to the capacity of the respective battery cell modules 220 and 230. Known control technology via individual control of a valve (not illustrated) may be applied to the control of the flow rate of coolant or brine.

Meanwhile, the thermal pad 500 is interposed between the battery cell module 220 or 230 and the cooling plate 400, and serves to prevent a gap from being formed between the lower surface of the battery cell module 220 or 230 and the upper surface of the cooling plate 400 and to transfer heat provided from the lower surface of the battery cell module 220 or 230 to the cooling plate 400. Thus, the thermal pad 500 may be formed of a material having high heat transfer efficiency, and may be formed of a flexible material, which may support the weight of the battery cell module 220 or 230 so as to prevent a gap, which deteriorates heat transfer performance, from being formed between the lower surface of the battery cell module 220 or 230 and the cooling plate 400.

The gap prevention pad 300 is disposed on the bottom of the receiving space of the battery carrier 210 together with the cell module support unit 240 described above, and serves to prevent a gap from being formed between the lower surface of the battery cell module 220 or 230 and the thermal pad 500 or between the thermal pad 500 and the cooling plate 400.

This serves to prevent a portion of the thermal pad 500 from being separated from the lower surface of the battery cell module 220 or 230 or to prevent the separation of the cooling plate 400 from a portion of the thermal pad 500, which is caused when a portion of the cooling plate 400 sags due to the weight of the cooling plate 400 because the cooling plate 400 is longitudinally elongated so as to correspond to the lower surface of the battery cell module 220 or 230 and the interior of the cooling plate 400 is filled with coolant or brine.

The assembly process of the battery pack 200 for the electric vehicle having the above-described configuration in accordance with an exemplary embodiment of the present invention will be described below in brief with reference to the accompanying drawings (in particular, FIGS. 7A to 7D).

First, as illustrated in FIG. 7A, the cell module support units 240 are disposed on and coupled to the bottom of the receiving space in the battery carrier 210. At this time, the cell module support units 240 may be equal in number to the number of the battery cell modules 220 and 230 which are disposed on the bottom of the receiving space in the battery carrier 210.

In addition, as illustrated in FIG. 7A, the gap prevention pads 300 (that are limited to the gap prevention pad 300 in accordance with a first embodiment which will be described below) are located in installation holes 242 formed in the respective cell module support units 240. The gap prevention pads 300 may be coupled to the bottom of the receiving space in the battery carrier 210 using fastening members (not illustrated), and of course, may be coupled using adhesive members such as, for example, an adhesive.

Subsequently, as illustrated in FIG. 7B, the cooling plates 400 are coupled to the bottom of the receiving space in the battery carrier 210 using fastening members 423 such as bolts, so as to cover the cell module support units 240 and the gap prevention pads 300.

Subsequently, as illustrated in FIG. 7C, the thermal pads 500 and the battery cell modules 220 and 230 are stacked one above another in sequence above the cooling plates 400. At this time, the battery cell modules 220 and 230 may be directly coupled to the bottom of the receiving space in the battery carrier 210 using fastening members 223 such as bolts, so as to remove gaps between the cooling plates 400, the thermal pads 500, and the lower surfaces of the battery cell modules 220 and 230.

In this way, when the cell module support units 240, the gap prevention pads 300, the cooling plates 400, the thermal pads 500, and the battery cell modules 220 and 230 are stacked one above another in the receiving space in the battery carrier 210, one battery pack may be completely assembled as illustrated in FIG. 7D.

Meanwhile, the gap prevention pad 300 may be implemented in two embodiments as will be described below.

FIG. 9 is a perspective view illustrating various application shapes of a gap prevention pad in accordance with a first embodiment, among constituent elements of the battery pack for the electric vehicle in accordance with the exemplary embodiment of the present invention. FIG. 10 is an exploded perspective view illustrating a gap prevention pad in accordance with a second embodiment, among constituent elements of the battery pack for the electric vehicle in accordance with the exemplary embodiment of the present invention, and FIG. 11 is a sectional view illustrating the mounted state of the battery cell module of FIG. 10.

The gap prevention pad 300 in accordance with the first embodiment, as illustrated in FIG. 9, has an important technical feature that the cell module support unit 240 is located in the installation hole 242, which is formed at a location of the cell module support unit 240 for supporting the central portion of the lower surface of the cooling plate 400.

In addition, the gap prevention pad 300 in accordance with the first embodiment may be shaped so as to be located between outermost fastening members 423, which are arranged at opposite longitudinal ends, among the fastening members 423 provided to secure the battery cell module 220 or 230 and the cell module support unit 240 to each other.

More specifically, the installation hole 242, which has an approximately rectangular shape, is vertically formed in the center of the cell module support unit 240 so as to expose a portion of the bottom of the receiving space in the battery carrier 210, and the gap prevention pad 300 in accordance with the first embodiment is provided in the installation hole 242.

Here, the gap prevention pad 300 in accordance with the first embodiment may be formed at a different height and/or may be formed of a different material from the cell module support unit 240. The gap prevention pad 300 may have a higher height of the upper surface than that of the cell module support unit 240, and may be formed of a material having a higher modulus of elasticity than that of the cell module support unit 240.

As illustrated in FIG. 9, the gap prevention pad 300 in accordance with the first embodiment described above may include two or more gap prevention pads 300 arranged in the installation hole 242.

That is, as illustrated in (a) of FIG. 9, two gap prevention pads 300B may be arranged parallel to each other by a long length in the longitudinal direction in the installation hole 242 having a rectangular shape. As illustrated in (b) of FIG. 9, two gap prevention pads 300C may be arranged parallel to each other in the direction orthogonal to the longitudinal direction. As illustrated in (c) of FIG. 9, four gap prevention pads 300B may be arranged parallel to one another in the longitudinal direction and in the direction orthogonal to the longitudinal direction.

Meanwhile, gap prevention pads 300' in accordance with a second embodiment, as illustrated in FIG. 10, have a technical configuration in which it is positioned to support opposite left and right ends of the cooling plate 400.

More specifically, the gap prevention pads 300' in accordance with the second embodiment, as illustrated in FIG. 10, may be disposed on the bottom of the receiving space in the battery carrier 210 so as to surround the rim of a cell module support unit 240'.

In addition, the gap prevention pads 300' in accordance with the second embodiment may be shaped and positioned so as to support the lower surface of the battery cell module 220 or 230 while surrounding the cell module support unit 240'.

Here, in the same manner as the gap prevention pad 300 in accordance with the first embodiment, the gap prevention pads 300' in accordance with the second embodiment may be formed at a different height from and/or may be formed of a different material from the cell module support unit 240'. The gap prevention pad 300' may have a higher upper surface than the upper surface of the cell module support unit 240', and may be formed of a material having a higher modulus of elasticity than that of the cell module support unit 240'.

Meanwhile, the gap prevention pads 300 and 300' in accordance with the first embodiment and the second embodiment may be formed of an elastic material. More specifically, the gap prevention pads 300 and 300' may be formed of any one of an elastic spring, rubber, and foamed plastics, thereby efficiently elastically supporting the cooling plate 400, which is provided in surface contact with and corresponds to the shape of the lower surface of the battery cell modules 220 and 230.

As illustrated in FIGS. 8A and 8B, the case where the gap prevention pad 300 in accordance with the first embodiment will be described below by way of example. When the battery cell module 220 or 230 having a flat lower surface is disposed on the location at which the gap prevention pad 300 in accordance with the first embodiment is provided, first, the gap prevention pad 300 in accordance with the first embodiment constricts upon receiving the weight from the central portion of the battery cell module 220 or 230 until the weight of opposite left and right ends of the battery cell module 220 or 230 is supported by the cell module support unit 240. Thereby, the battery cell module 220 or 230 is mounted in the same flat state as in the original form, which may prevent gaps from being formed between the lower surface of the battery cell module 220 or 230 and the thermal pad 500 and between the thermal pad 500 and the cooling plate 400.

In addition, although not illustrated in FIGS. 8A and 8B, in the case where the gap prevention pad 300 in accordance with the first embodiment is provided, when the battery cell module 220 or 230 having an upwardly convex lower surface is stacked on the gap prevention pad 300, first, the gap prevention pad 300 in accordance with the first embodiment constricts upon receiving the weight from the central portion of the battery cell module 220 or 230. However, because the lower surface of the battery cell module 220 or 230 is convex upward, the extent to which the gap prevention pad 300 in accordance with the first embodiment constricts is reduced. Therefore, it is possible to prevent gaps from being formed between the lower surface of the battery cell module 220 or 230 and the thermal pad 500 and between the thermal pad 500 and the cooling plate 400 while maintaining the shape of the lower surface of the battery cell module 220 or 230 having the original shape.

Likewise, although not illustrated in FIGS. 8A and 8B, in the case where the gap prevention pad 300 in accordance with the first embodiment is provided, when the battery cell module 220 or 230 having a downwardly concave lower surface is stacked on the gap prevention pad 300, first, the gap prevention pad 300 in accordance with the first embodiment constricts upon receiving the weight from the central portion of the battery cell module 220 or 230 until the weight of opposite left and right ends of the battery cell module 220 and 230 is supported by the cell module support unit 240, it is possible to prevent gaps from being formed between the lower surface of the battery cell module 220 or 230 and the thermal pad 500 and between the thermal pad 500 and the cooling plate 400 while maintaining the shape of the lower surface of the battery cell module 220 or 230 having the original shape.

In addition, as illustrated in FIG. 10, the case where the gap prevention pad 300' in accordance with the second embodiment will be described below by way of example. When the battery cell module 220 or 230 having a flat lower surface is stacked on the location at which the gap prevention pad 300' in accordance with the second embodiment is provided, first, the gap prevention pad 300' in accordance with the second embodiment constricts upon receiving the weight from opposite left and right ends of the battery cell module 220 or 230 until the height thereof becomes the same as the height of the center cell module support unit 240', thereby consequently allowing the battery cell module 220 or 230 to be mounted in the flat state as in the original shape thereof. In this way, it is possible to prevent gaps from being formed between the lower surface of the battery cell module 220 or 230 and the thermal pad 500 and between the thermal pad 500 and the cooling plate 400.

In addition, although not illustrated in FIG. 10, the case where the gap prevention pad 300' in accordance with the second embodiment is provided, when the battery cell module 220 or 230 having an upwardly convex lower surface is stacked on the gap prevention pad 300' in accordance with the second embodiment, first, the gap prevention pad 300' in accordance with the second embodiment constricts upon receiving the weight from opposite left and right ends of the battery cell module 220 or 230 until the weight of the central portion of the battery cell module 220 or 230 is supported by the cell module support unit 240', thereby preventing gaps from being formed between the lower surface of the battery cell module 220 or 230 and the thermal pad 500 and between the thermal pad 500 and the cooling plate 400 while maintaining the shape of the lower surface of the battery cell module 220 or 230.

Likewise, although not illustrated in FIG. 10, the case where the gap prevention pad 300' in accordance with the second embodiment is provided, when the battery cell module 220 or 230 having a downwardly concave lower surface is stacked on the gap prevention pad 300' in accordance with the second embodiment, first, the gap prevention pad 300' in accordance with the second embodiment constricts upon receiving the weight from opposite left and right ends of the battery cell module 220 or 230 until the weight of the central portion of the battery cell module 220 or 230 is supported by the cell module support unit 240', which causes the extent to which the gap prevention pad 300' constricts is reduced. In conclusion, it is possible to prevent gaps from being formed between the lower surface of the battery cell module 220 or 230 and the thermal pad 500 and between the thermal pad 500 and the cooling plate 400 while maintaining the shape of the lower surface of the battery cell module 220 or 230 having the original shape.

In accordance with one exemplary embodiment of the battery pack 200 for the electric vehicle in accordance with the present invention having the above-described configuration, as a result of preventing gaps from being formed between the battery cell modules 200 and 230 and the thermal pads 500 and between the thermal pads 500 and the cooling plates 400 while maintaining the shape of the battery cell modules 220 and 230 through the use of the gap prevention pads 300 and 300', it is possible to prevent deterioration in cooling performance.

In addition, the gap prevention pads 300 and 300' are configured to elastically support the lower surfaces of the battery cell modules 220 and 230, which are vulnerable to, for example, vibrations, thereby preventing deterioration in the durability of the battery cell modules 220 and 230.

Although the preferred embodiments of the battery pack for the electric vehicle in accordance with the present invention have been illustrated and described, the present invention is not limited to the above described particular embodiments, and various modifications, additions and substitutions are possible by those skilled in the art without departing from the scope and spirit of the invention as disclosed in the accompanying claims. All the modifications, additions and substitutions are not intended to be understood individually from the technical sprit or outlook of the present invention.

The invention claimed is:

1. A battery pack for an electric vehicle, comprising:
a battery cell module;
a cell module support unit that is configured to support the battery cell module;
a battery receiving region configured to accommodate the cell module support unit;
a cooling plate that is located between the battery cell module and the cell module support unit, wherein a shape of the cooling plate corresponds to a shape of the battery cell module, the cooling plate including:
    an upper surface that is in contact with a lower surface of the battery cell module and that supports the lower surface of the battery cell module, and
    a lower surface that is in contact with the cell module support unit; and
a gap prevention pad that is configured to support a central portion of the lower surface of the cooling plate and that is configured to, in a state in which the battery cell module is coupled to the battery receiving region, prevent a gap formation between the cooling plate and the battery cell module,
wherein the cell module support unit defines an installation hole configured to receive the gap prevention pad, and is configured to support a region of the lower surface of the cooling plate outside of the central portion of the lower surface of the cooling plate.

2. The battery pack of claim 1, wherein the gap prevention pad includes a plurality of pads, at least one of the pads being located at a height that is different from a height of the cell module support unit and including a material that is different from a material of the cell module support unit,
    wherein the gap prevention pad is in contact with the cooling plate.

3. The battery pack of claim 1, wherein the gap prevention pad includes a plurality of pads, at least one of the pads being located at a height that is different from a height of the cell module support unit or including material that is different from a material of the cell module support unit, and
    wherein the gap prevention pad is in contact with the cooling plate.

4. The battery pack of claim 3, wherein the gap prevention pad is located between outermost fastening members at longitudinal opposite ends from a plurality of fastening members that are configured to hold the battery cell module and the cell module support unit.

5. The battery pack of claim 1, wherein the battery receiving region includes a pad seating recess in which the gap prevention pad is located and to which the gap prevention pad is coupled.

6. The battery pack of claim 1, further comprising;
an air conditioning module that includes a compressor, a condenser, an expander, and an evaporator,
wherein the cooling plate includes:
    an inlet port that is configured to receive coolant diverged from a first side of the air conditioning module, and
    an outlet port that is configured to supply coolant that has, exchanged heat with the battery cell module to a second side of the air conditioning module.

7. The battery pack of claim 1, further comprising:
an inner heat exchanger that is configured to exchange heat with coolant diverged from one of a path between a compressor and a condenser, a path between the condenser and an expander, a path between the expander and an evaporator, or a path between the evaporator and the compressor; and
a pump that is configured to guide brine that has exchanged heat through the inner heat exchanger to the cooling plate,
wherein the cooling plate includes an inlet port and an outlet port that are configured to receive and discharge the brine.

8. The battery pack of claim 7, further comprising:
a cooling supply hose and a cooling discharge hose respectively coupled to the inlet port and the outlet port of the cooling plate that are configured to receive and discharge the brine inside the cooling plate,
wherein a number of the cooling supply hose and a number of the cooling discharge hose are determined based on a number of the battery cell module, and
wherein a flow rate of the brine that flows through the cooling supply hose and the cooling discharge hose is controlled based on a capacity of the battery cell module.

9. The battery pack of claim 1, wherein the cell module support unit defines the installation hole at a central region of the cell module support unit corresponding to the central portion of the lower surface of the cooling plate.

10. The battery pack of claim 1, wherein an area of the installation hole is greater than an area of the gap prevention pad, and
    wherein a portion of a bottom surface of the battery receiving region is exposed between the cell module support unit and the gap prevention pad.

11. The battery pack of claim 1, wherein an inner periphery of the cell module support unit defines the installation hole, and is spaced apart from an outer periphery of the gap prevention pad received in the installation hole.

12. A battery pack for an electric vehicle, the battery pack comprising:
a battery cell module;
a battery carrier that defines a receiving space configured to accommodate the battery cell module, the battery carrier being configured to be secured to a vehicle body through a fastening member;
a cell module support unit that is located on a bottom of the receiving space in the battery carrier;
a cooling plate that is mounted on the cell module support unit, the cooling plate including:
    an upper surface that is in contact with a lower surface of the battery cell module and that supports the lower surface of the battery cell module, and
    a lower surface that is in contact with the cell module support unit;
a thermal pad that is located between the battery cell module and the cooling plate and that is configured to transfer heat generated in the battery cell module to the cooling plate; and
a gap prevention pad that is located on the bottom of the receiving space in the battery carrier, that is configured to support a central portion of the lower surface of the cooling plate, and that is configured to prevent a gap formation between the lower surface of the battery cell module and the thermal pad and a gap between the thermal pad and the cooling plate,
wherein the cell module support unit defines an installation hole configured to receive the gap prevention pad, and is configured to support a region of the lower surface of the cooling plate outside of the central portion of the lower surface of the cooling plate.

13. The battery pack of claim 12, wherein the gap prevention pad includes at least two or more gap prevention pads that are arranged in the installation hole.

14. The battery pack of claim 12, wherein the gap prevention pad includes an elastic material.

15. The battery pack of claim 12, wherein the gap prevention pad includes one of an elastic spring, rubber, or foamed plastics.

16. The battery pack of claim 12, further comprising:
a cooling supply hose that is configured to supply coolant or brine into the cooling plate;

a cooling discharge hose that is configured to discharge coolant or brine having exchanged heat with the cooling plate, wherein the cooling plate includes:
- an inlet port that is configured to receive coolant or brine from the cooling supply hose and
- an outlet port that is configured to discharge coolant or brine having exchanged heat from the cooling discharge hose.

* * * * *